US007065445B2

(12) United States Patent
Thayer et al.

(10) Patent No.: US 7,065,445 B2
(45) Date of Patent: Jun. 20, 2006

(54) VEHICLE PASSIVE ALERT SYSTEM AND METHOD

(75) Inventors: Peter A. Thayer, Mountain View, CA (US); Victor Shao, Mountain View, CA (US); Subramanian Mahesh, Sunnyvale, CA (US)

(73) Assignee: MobileAria, Mountain View, CA (US)

( * ) Notice: Subject to any disclaimer, the term of this patent is extended or adjusted under 35 U.S.C. 154(b) by 107 days.

(21) Appl. No.: 10/395,841

(22) Filed: Mar. 24, 2003

(65) Prior Publication Data

US 2004/0102895 A1 May 27, 2004

Related U.S. Application Data

(63) Continuation-in-part of application No. 10/306,679, filed on Nov. 27, 2002.

(51) Int. Cl.
*G08G 1/09* (2006.01)
*G01W 1/00* (2006.01)

(52) U.S. Cl. ....................... 701/200; 701/201; 701/207; 701/208; 701/211; 701/213; 340/988; 340/989; 340/992; 340/993; 340/995.13; 340/995.24

(58) Field of Classification Search ................. 701/200, 701/201, 207, 208, 211, 213; 340/988, 989, 340/992–994, 995.13, 995.24
See application file for complete search history.

(56) References Cited

U.S. PATENT DOCUMENTS 3,875,379 A 4/1975 Vietor
3,947,809 A 3/1976 Bateman
4,792,906 A 12/1988 King et al.
5,526,000 A 6/1996 Chazelle et al.
5,648,768 A * 7/1997 Bouve ........................ 340/988
5,825,283 A 10/1998 Camhi
5,867,804 A 2/1999 Pilley et al.
5,922,040 A 7/1999 Prabhakaran
5,949,345 A * 9/1999 Beckert et al. ........ 340/815.41
5,999,882 A * 12/1999 Simpson et al. ............... 702/3
6,031,455 A * 2/2000 Grube et al. ........... 340/539.26
6,073,075 A * 6/2000 Kondou et al. ............. 701/203
6,209,026 B1 * 3/2001 Ran et al. ................... 709/218
6,304,816 B1 * 10/2001 Berstis ....................... 701/117
6,317,686 B1 * 11/2001 Ran ........................... 701/210
6,339,745 B1 1/2002 Novik
6,347,263 B1 2/2002 Johnson et al.
6,353,398 B1 * 3/2002 Amin et al. ........... 340/995.12
6,654,689 B1 * 11/2003 Kelly et al. .................... 702/3
2001/0020213 A1 * 9/2001 Hatano ....................... 701/207
2002/0067289 A1 * 6/2002 Smith ......................... 340/905
2002/0121989 A1 * 9/2002 Burns ......................... 340/901
2002/0143461 A1 10/2002 Burns et al.

FOREIGN PATENT DOCUMENTS

GB 2 227 389 7/1990

* cited by examiner

*Primary Examiner*—Thomas G. Black
*Assistant Examiner*—Eric M. Gibson
(74) *Attorney, Agent, or Firm*—Thelen Reid & Priest LLP

(57) ABSTRACT

A passive alert system is provided for vehicles traveling along a predetermined travel route. The vehicles are equipped with vehicle processing systems which are in communication with a remote server. The remote server acquires information pertaining to conditions along the travel route, such as weather and traffic conditions, and determines if these conditions are of a nature which warrants reporting them to the vehicle processing systems.

53 Claims, 3 Drawing Sheets

VEHICLE PASSIVE ALERT SYSTEM AND METHOD

CROSS-REFERENCE TO RELATED APPLICATIONS

This application is a continuation-in-part of U.S. patent application Ser. No. 10/306,679 entitled "METHOD AND APPARATUS FOR PROVIDING INFORMATION PERTAINING TO VEHICLES LOCATED ALONG A PREDETERMINED TRAVEL ROUTE," filed Nov. 27, 2002, and incorporated herein by reference in its entirety.

BACKGROUND OF THE INVENTION

The invention relates to vehicle fleet management, and more particularly, to a passive system for manipulating travel route condition information.

BRIEF SUMMARY OF THE INVENTION

In accordance with the invention, a passive alert system for a vehicle adapted to travel along a predetermined travel route is provided, and includes a vehicle processing system disposed onboard the vehicle and a server which is remote from the vehicle. The server acquires condition information relating to one or more prospective points along the travel route, generates one or more alerts based on the acquired condition information, and transmits the one or more alerts wirelessly to the vehicle processing system.

Further in accordance with the invention, a server for providing alerts to remote processing systems onboard a vehicle which is adapted to travel along a predetermined travel route is provided. The server includes a vehicle location monitoring system for providing vehicle location information, and a condition information broker adapted to communicate with a service provider and acquire therefrom condition information along one or more prospective points along the travel route, the prospective points being based a closest known position of the vehicle as indicated by the vehicle location information. The server also includes an alert generator for generating one or more alerts based on the condition information acquired from the service provider, and a communication manager for establishing a communication link with the remote processing system through which the one or more alerts are sent.

Further in accordance with the invention, a method for communicating passive alerts from a server to a vehicle having a vehicle processing system and traveling along a predetermined travel route is disclosed. The method includes determining a closest known position of the vehicle, acquiring condition information relating to one or more prospective points along the travel route, generating one or more alerts based on the acquired condition information, and transmitting the one or more alerts wirelessly to the vehicle processing system.

Further in accordance with the invention, a computer-readable media containing one or more programs which execute the following procedure for communicating passive alerts from a server to a vehicle having a vehicle processing system and traveling along a predetermined travel route is provided, and includes determining a closest known position of the vehicle, acquiring condition information relating to one or more prospective points along the travel route, generating one or more alerts based on the acquired condition information, and transmitting the one or more alerts wirelessly to the vehicle processing system.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements.

DETAILED DESCRIPTION OF THE INVENTION

Figure 1:
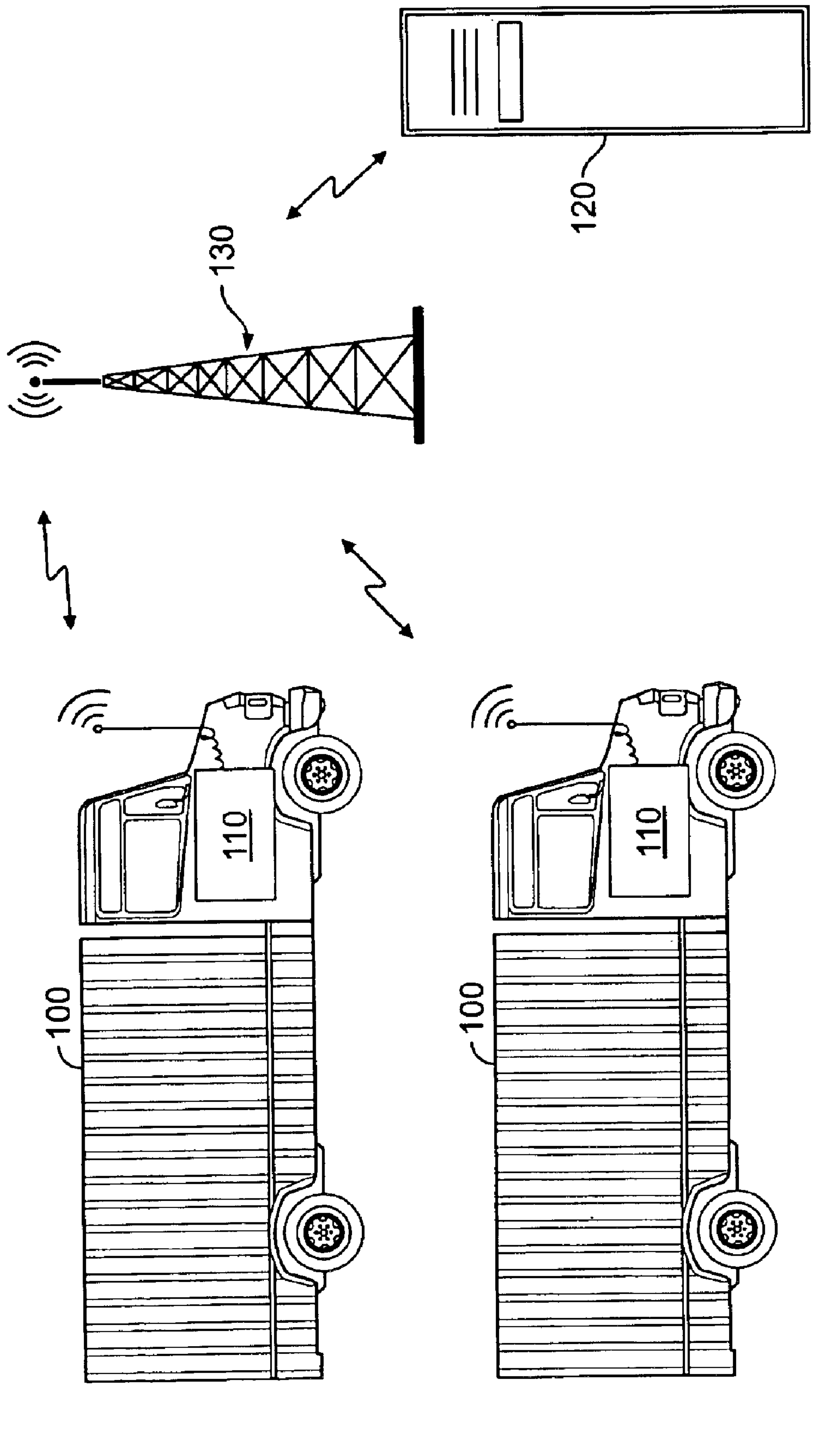
FIG. 1 is a schematic illustration of the use of the invention with a trucking fleet.

FIG. 1 schematically shows a trucking fleet consisting of a plurality of trucks 100 which are in communication with a remote server 120 via a cellular network represented by antenna 130. Cellular network would normally have multiple components, including other antennas, satellites and associated links, and so forth, which are omitted herein for simplicity. It is also contemplated that modes of wireless communication between trucks 100 and server 120 other than a cellular network may be implemented.

Each truck 100 is provided with a vehicle processing system 110 which determines and monitors truck status information, including for example location, and relays this information to server 120 as appropriate. Location information is determined via GPS (Global Positioning System), preferably in accordance with the GeoWave™ algorithms disclosed in copending U.S. patent application No. 10/306,679 entitled "METHOD AND APPARATUS FOR PROVIDING INFORMATION PERTAINING TO VEHICLES LOCATED ALONG A PREDETERMINED TRAVEL ROUTE," filed Nov. 27, 2002, and incorporated herein by reference in its entirety.

In the aforementioned copending application, a server such as server 120 determines an optimal travel route for a vehicle such as a truck 100 based on the start and end points. The travel route is divided into one or more segments, each of which is associated with a corridor having prescribed dimensions and encompassing the associated segment. During the time that the vehicle is traveling along the travel route, expectancy zones having prescribed dimensions are representationally propagated through the corridors, at prescribed speeds corresponding to the speed of the vehicle in that corridor. The expectancy zones correspond to a region in which the vehicle is expected to be at a particular moment in time. Deviation from the expectancy zones, as determined by GPS readings, triggers alerts which can be used to invoke remedial action, such as communications to the driver, notification of local authorities, or remote vehicle disablement.

Figure 2:
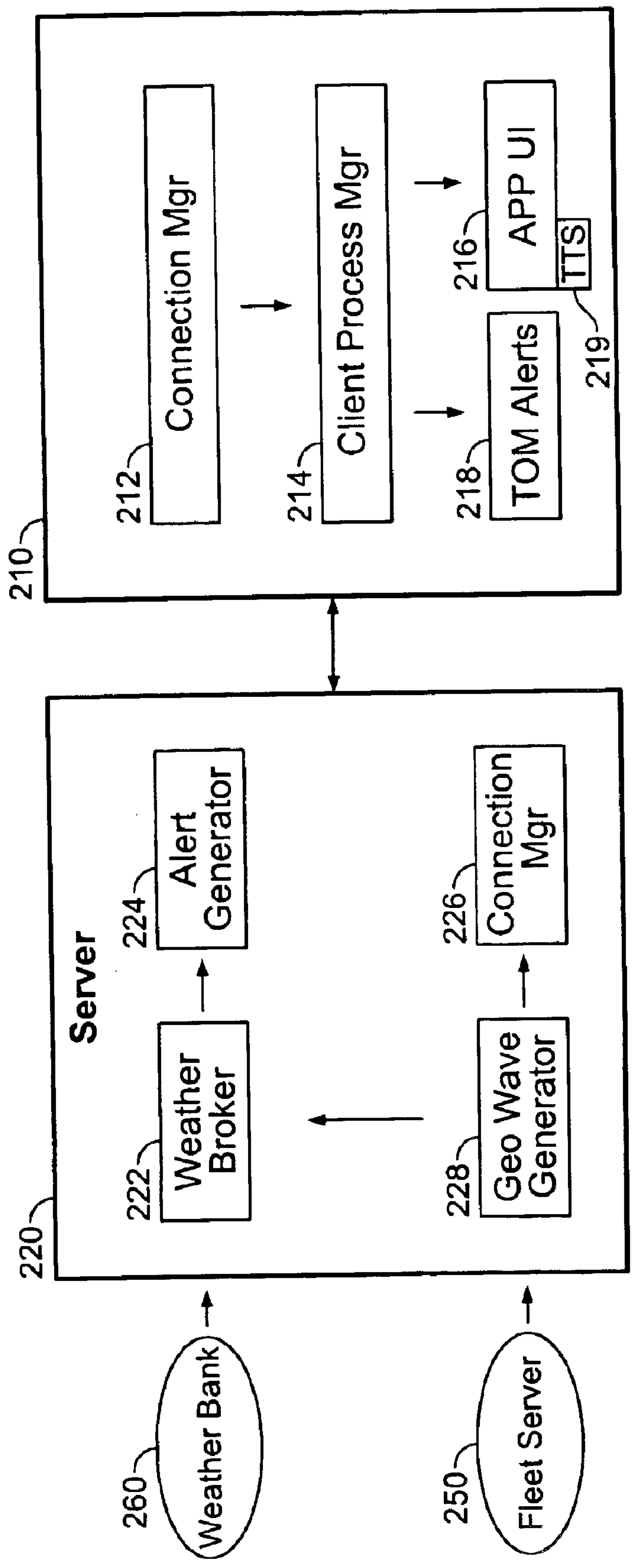
FIG. 2, is a block diagram of a system using a weather broker in accordance with the invention.

FIG. 2 is an architectural diagram of a passive alert system showing a vehicle processing system 210, which may be one of multiple such systems associated with respective vehicles of a fleet, all of which are in wireless communication with a server 220. The systems 210 and the server 220 may be the same devices, respectively, as the systems 110 and server 120 shown in FIG. 1, but suitably configured to conduct the passive alert functions of the invention as described in greater detail below. Alternatively, they may be completely different devices used in conjunction with devices 110 and 120, depending on the particular application.

Other devices with which server 220 communicates, either wirelessly or through a network such as the Internet, WAN (Wide Area Network), LAN (Local Area Network), and so forth, include a fleet server 250, and a weather service provider such as WeatherBank™ (260), the function of which is described in greater detail below. Multiple fleet servers 250 (only one is shown) are contemplated, each associated with a fleet of vehicles, operating to provide services relating to said fleet in accordance with the aforementioned copending application. Thus it can be seen that server 220 may be used in conjunction with multiple fleets of vehicles, each containing one or more vehicles. It will also be appreciated that one or more fleet servers 250 may be physically integral with server 220—that is, they may simply be separate processes running on server 220.

Server 220 includes a condition information broker, in the form of weather broker 222, along with an alert generator 224, a connection manager 226, and a vehicle location monitoring system such as GeoWave™ generator 228. As discussed above, the GeoWave™ generator 228 may be part of a separate device, such as a server 120, or it may be integral with server 220. GeoWave™ generator 228 provides position information, in the form of GPS latitude and longitude coordinates, to weather broker 222. The position information of GeoWave™ generator 228 corresponds to the travel route information as described in the aforementioned application, and includes, for travel routes determined to be active: the latitude and longitude coordinates of the start and end points of the travel route; start and end points of the one or more corridors associated with the travel route; and other points, such as waypoints, along the travel route. A travel route is determined to be active if it relates to a vehicle in the system which is currently traveling along the travel route.

The weather broker 222 performs several functions. Among these is compiling a list of geographical points whose weather conditions and forecasts are to be determined; coordinating the communication with the weather information provider, such as WeatherBank™, to obtain the weather conditions and forecasts and further populate the compiled list with this information; examining the list for alertable items; and sending out alerts to the appropriate vehicle processing systems 210.

The process of compiling the list of geographical points whose weather conditions and forecasts are to be determined, as performed by weather broker 222, is implemented with reference to information from GeoWave™ generator 228, which generates a data matrix containing geographical points based on the determined travel route in the manner disclosed in the aforementioned copending application. Weather broker 222 uses points from each data matrix associated with a travel route it determines to be active. It searches the data matrix and selects the point—Last Point Reached—closest to the current position of the vehicle. This information is known for example from the GeoWave™ procedures performed in accordance with the aforementioned application.

An example of how the Last Point Reached can be determined is to search a Route Vector Table and find the last point having a Point Reached flag set to "yes." Once determined, an ETA (Estimated Arrival Time) associated with the Last Point Reached is compared to system time, and an offset is calculated from the difference. Then, based on the ETA of the Last Point Reached and corresponding offset, a set of one or more short-term prospective points is formulated, the set preferably consisting of four such points. The set of short-term prospective points represents points along the travel route at which the vehicle is expected to be during a particular time window in the future. For example, during the four hour time window following the time the Last Point Reached was reached, taking the offset into account, a set of 1 to 4 geographical points through which the vehicle is expected to pass is formulated, making reference to the data matrix as necessary.

In addition to the set of short-term prospective points, a set of long-term prospective points is also formulated, the latter set preferably consisting of two points along the travel route whose ETAs are, respectively, one and two days into the future. More days into the future are also possible. The short- and long-term prospective points provide the basis for obtaining weather and forecast information by weather broker 222. Using these prospective points, weather broker 222, which is contact with a weather information provider, such as WeatherBank™, via an HTTP/XML interface, makes an HTTP call to WeatherBank™. The prospective points are identified by their latitude and longitude coordinates, and this information is included in the call to WeatherBank™ (whose URL is WeatherBank.com). An example of a call for a particular prospective point is as follows:

http://itxt.weatherbank.com:8080/?Mobilaria:42.2,-112.0

WeatherBank™ responds to such a call with an XML response, which is reproduced as Appendix A. The XML response from WeatherBank™, includes current conditions for the particular point, as well as the five-day forecast (period-1, period-2, period-3, period-4, and period-5), for that point. Not all of the information provided in the response needs to be used, and the particular selection of the information used will depend on the specific application. Exemplarily, only the <weather wxcode> content for the <current>, <period-1> and <period-2> are used. In other words, for the prospective point selected, only the current weather conditions of that point, and the forecast conditions one day and two days forward at that point, are selected. Table A is a list of all the possible wxcode information which can be provided in the XML response from WeatherBank™.

TABLE A

| Value | Weather Condition |
|---|---|
| 0 | No Report |
| 1 | Hail |
| 2 | Severe Thunderstorm |
| 3 | Freezing Rain |
| 4 | Freezing Drizzle |
| 5 | Thunder Snow Shower |
| 6 | Heavy Snow |
| 7 | Rain and Snow |
| 8 | Snow Showers |
| 9 | Light Snow |
| 10 | Moderate Snow |
| 11 | Snow Pellets |
| 12 | Snow Grains |
| 13 | Ice Pellets |
| 14 | Heavy Thundershower |
| 15 | Light Thundershower |
| 16 | Moderate Thundershower |
| 17 | Heavy Rain |
| 18 | Light Rain |
| 19 | Moderate Rain |
| 20 | Heavy Drizzle |
| 21 | Light Drizzle |
| 22 | Drizzle |
| 23 | Blowing Snow |
| 24 | Blowing Sand |
| 25 | Blowing Dust |
| 26 | Dust |
| 27 | Ground Fog |
| 28 | Ice Crystals |
| 29 | Ice Fog |
| 30 | Thick Fog |
| 31 | Thunder |
| 32 | Smog |
| 33 | Light Fog |
| 34 | Fog |
| 35 | Haze |

TABLE A-continued

| Value | Weather Condition |
|---|---|
| 36 | Sky Obscured |
| 37 | Thin Obscured, #1 |
| 38 | Obscured |
| 39 | Thin Obscured, #2 |
| 40 | Overcast |
| 41 | Thin Overcast |
| 42 | Mostly Cloudy |
| 43 | Partly Cloudy, #1 |
| 44 | Partly Cloudy, #2 |
| 45 | Mostly Clear, #1 |
| 46 | Fair, #1 |
| 47 | Clear, #1 |
| 48 | Fair, #2 |
| 49 | Fair, #3 |
| 50 | High Overcast |
| 51 | High Thin Overcast |
| 52 | High Clouds |
| 53 | High Thin Clouds |
| 54 | Few High Clouds |
| 55 | Mostly Clear, #2 |
| 56 | Fair, #4 |
| 57 | Clear, #2 |
| 58 | Fair, #5 |
| 59 | Clear, #3 |
| 60 | Funnel Cloud, Tornado |
| 61 | Sandstorm |
| 62 | Duststorm |
| 63 | Patchy Fog |
| 64 | Mist |
| 65 | Volcanic Ash |

Weather broker 222 examines the <weather wxcode> information for the three time periods—that is, the <current>, <period-1> and <period-2>—for each prospective point. Based on the examination, conditions requiring further action are determined. Table B provides a list of the <current> conditions which are deemed to require further attention, while Table C provides a list of <period-1> and <period-2> conditions deemed to require further attention.

TABLE B

| wxcode Value | Description | Alert Severity |
|---|---|---|
| 1 | Hail | 1 |
| 2 | Severe Thunderstorm | 1 |
| 3 | Freezing Rain | 1 |
| 4 | Freezing Drizzle | 1 |
| 5 | Thunder Snow Shower | 1 |
| 6 | Heavy Snow | 1 |
| 7 | Rain and Snow | 1 |
| 8 | Snow Showers | 1 |
| 9 | Light Snow | 3 |
| 10 | Moderate Snow | 2 |
| 11 | Snow Pellets | 1 |
| 12 | Snow Grains | 2 |
| 13 | Ice Pellets | 1 |
| 14 | Heavy Thundershower | 1 |
| 15 | Light Thundershower | 2 |
| 16 | Moderate Thundershower | 1 |
| 17 | Heavy Rain | 1 |
| 19 | Moderate Rain | 3 |
| 23 | Blowing Snow | 1 |
| 24 | Blowing Sand | 1 |
| 25 | Blowing Dust | 1 |
| 27 | Ground Fog | 2 |
| 28 | Ice Crystals | 2 |
| 29 | Ice Fog | 2 |
| 30 | Thick Fog | 1 |
| 33 | Light Fog | 3 |
| 34 | Fog | 2 |
| 60 | Funnel Cloud, Tornado | 1 |
| 61 | Sandstorm | 1 |

TABLE B-continued

| wxcode Value | Description | Alert Severity |
|---|---|---|
| 62 | Duststorm | 1 |
| 63 | Patchy Fog | 2 |
| 64 | Mist | 2 |
| 65 | Volcanic Ash | 1 |

TABLE C

| wxcode Value | Description | Alert Severity |
|---|---|---|
| AA | Cloudy, Scattered Snow Showers | 2 |
| AB | Overcast, Scattered Snow Showers | 2 |
| AC | Partly Cloudy, Snow Showers | 2 |
| AD | Snow | 1 |
| AF | Partly Cloudy; Snow Showers | 2 |
| W | Partly Cloudy; Widely Scattered Snow Showers | 2 |
| X | Mostly Cloudy; Widely Scattered Snow Showers | 2 |
| Y | Overcast; Widely Scattered Snow Showers | 2 |
| Z | Partly Cloudy; Scattered Snow Showers | 2 |

Tables B and C are subsets of the total possible conditions which may be indicated in the XML response from WeatherBank™ (that is, they are subsets of Table A), and are selected for their relevance to the exemplary application disclosed herein. It will be appreciated that other subsets may be selected, depending on the application, without departure from the spirit and scope of the invention. It will further be appreciated that Tables B and C are different from one another (although this will not necessarily always be the case), because conditions which are a few hours away (that is, conditions relating to the <current> information) may require different treatment than conditions which may be a day or two days into the future (conditions relating to the <period-1> and <period-2> information).

Tables B and C also provide severity assignments for the different conditions listed therein. These assignments are exemplary, and may be different depending on the application.

The entries in Tables B and C is herein referred to altertable conditions, because it comprises information which should be conveyed to the driver of the vehicle involved, or otherwise acted upon. Thus when any of the conditions listed in Table B are indicated in the <current> tag in the XML response from WeatherBank™, or any of the conditions listed in Table C are indicated in the <period-1> and <period-2> tag, weather broker 222 directs alert manager 230 to generate an alert signal—which signal includes the nature of and severity of the alert, along with its location, which may be identified by a weather station location from which the report issued, and the date of the conditions for the <period-1> and <period-2> information—and to send alert signal, via communication manager 232, to the associated vehicle processing system 110, for example through the cellular network described above (FIG. 1).

It may be desirable under some circumstances to limit the number of alerts sent from server 220 to vehicle processing system 210. Thus if more than one alertable condition is encountered, weather broker 222 may prioritize the alertable conditions, selecting for instance the condition with the highest severity rating as the one to base the alert upon. In this manner, communications resources may be conserved.

Communication between server 220 and vehicle processing system is facilitated by connection managers 226 and 212. The alert from server 220 is forwarded to client process manager 214 and then to application user interface 216 and output manager (TOM) 218.

Application user interface 216 is a process which responds differently depending on the situation. For instance, if the parking brake of the vehicle is disengaged, indicating that the vehicle is en route, then the alerts can be provided to the vehicle operator in auditory form. Specifically, a TTS (text-to-speech) conversion device 219 can be used to announce the alert verbally, in order to reduce distractions to the operator. Alternatively, if the parking brake is engaged, the alerts can be provided in visual form, using a dash-mounted component (not shown) having a display screen suitable for the purpose. A combination of the two expedients can also be employed, depending on the application.

Figure 3:
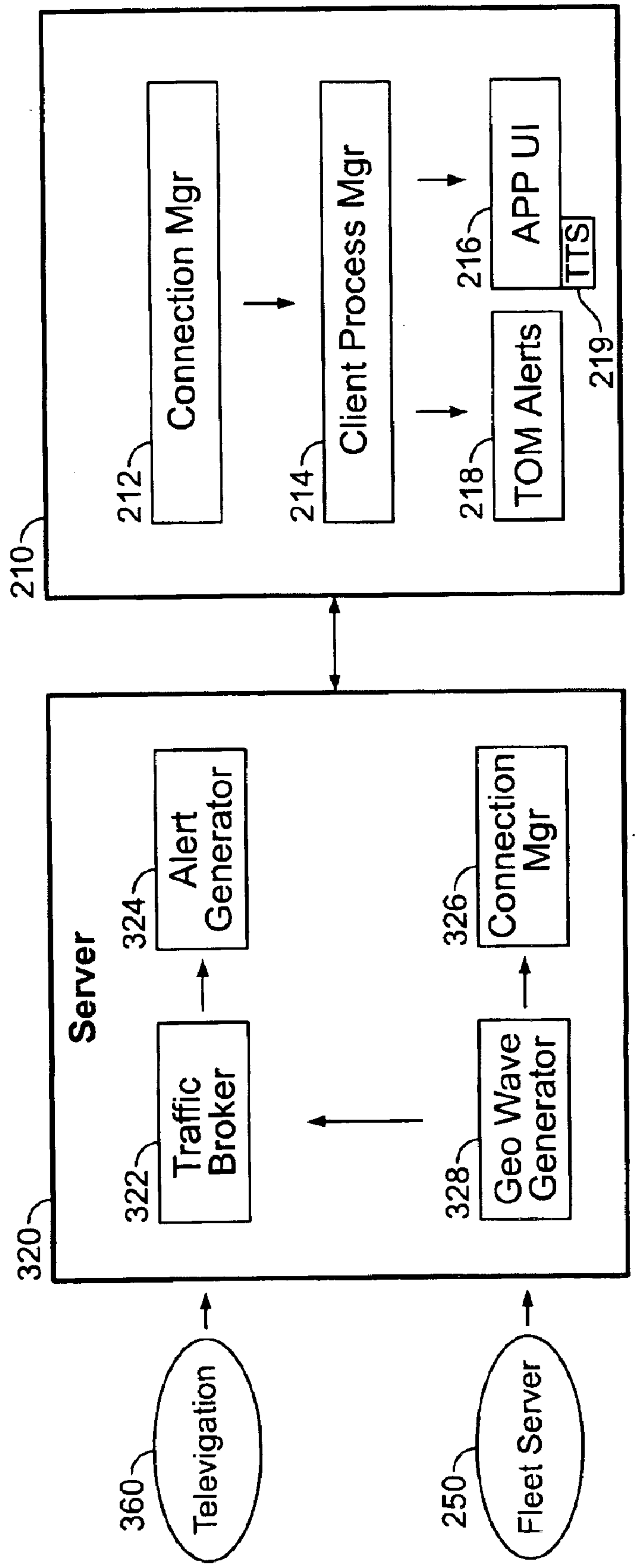
FIG. 3, is a block diagram of a system using a traffic broker in accordance with the invention.

While in the above example the invention is described in terms of weather-related conditions, it will be appreciated that other conditions can be monitored and conveyed to the vehicle operator. FIG. 3 is an example directed to traffic conditions, and depicts a traffic broker 322 operating as the condition information broker in server 320. Traffic broker 322 can replace weather broker 222, and the system can be used exclusively to provide traffic information, in a process further described below. Alternatively, traffic broker 322 can operate in conjunction with weather broker 222, and both traffic and weather information can be provided. Further, weather traffic broker 322 and weather broker 222 can be combined into a single broker (not shown) capable of performing the functions of both devices. The particular configuration depends on the application and falls within the purview of the invention.

With reference to FIG. 3, traffic broker 322 operates in conjunction with GeoWave™ generator 228, searching the data matrix containing geographical points based on the determined travel route to select the point—Last Point Reached—closest to the current position of the vehicle. Once determined, an ETA associated with the Last Point Reached is compared to system time, and an offset is calculated from the difference. Then, based on the ETA of the Last Point Reached and corresponding offset, a prospective points is determined. The prospective point represents a point along the travel route at which the vehicle is expected to be during a particular time window in the future. For traffic information, a single prospective point, about fifteen minutes into the future, may suffice.

Traffic broker 322 is in contact with a traffic service provider, such as Televigation™ (360), via an HTTP/XML interface. Televigation™ is configured to provide information by market, by area, or by route. Using the preferred by-route approach, a request is sent to Televigation™, via an XML post, for information pertaining to the portion of the travel route between the Last Point Reach and the prospective point, taking the determined offset into account. The points are identified by their latitude and longitude coordinates. The XML response from Televigation™, an example of which is reproduced in Appendix B, provides a comprehensive data set of traffic incidents along the associated travel route portion. The data set includes the following information:

| | |
|---|---|
| IncID: | This information is the incident identification, and is unique to an incident, or to an incident update. Thus an update of the same incident would have a new IncID. |

-continued

| | |
|---|---|
| <Impact>: | This information pertains to the severity of the incident. |
| <Diversion>: | This information provides an indication as to whether an alternate route should be found and taken. |
| <Travel-Direction>: | This information pertains to the direction of travel affected by the incident. |
| <MainRoad>: | This information pertains to the current roadway or a landmark. |
| <CrossRoad1>: | This information indicates the intersection at which the traffic incident occurred. |
| <UpdateTime>: | This information pertains to the time of the update. |
| <Expected-EndTime>: | This information pertains to the expected end time of the update. |
| <Ramp>: | This information indicates the type of highway ramp (Southbound, Eastbound, etc.) on which the incident occurred. |
| <Incident-Descr>: | This information contains a verbal description of the traffic incident. |

Traffic broker 322 stores the incident identification information and sets it to automatically expire within a set period of time, preferably about one hour. When a traffic incident is retrieved from Televigation™, the IncID is checked against this stored information, and if it already exists, then an alert pertaining to this incident has already been sent and is not resent. If it does not already exist, then an alert is sent to the vehicle processing system 210, subject to additional filtering. This additional filtering could include, for example, only sending alerts whose impact—that is, severity—is above a predetermined threshold, such that minor traffic incidents are not alerted.

The alert is generated in alert generator 324, and sent wirelessly, via connection manager 326, in the manner described above with respect to the weather-related information. The traffic alert includes some or all of the above-listed information from Televigation™. Once received by vehicle processing system 210, the alert can be presented to the operator visually and/or audibly, depending on the situation—for instance, in accordance to whether the parking brake is engaged or disengaged.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A passive alert system for a vehicle adapted to travel along a predetermined travel route, the passive alert system comprising:

a vehicle processing system disposed onboard the vehicle; and a server remote from the vehicle, the server acquiring condition information relating to one or more prospective points along the travel route, generating one or more alerts based on the acquired condition information, and transmitting the one or more alerts wirelessly to the vehicle processing system, wherein the condition information pertains to weather conditions, and wherein each alert includes at least one alertable condition selected from one or more lists of alertable conditions one of the two lists associated with short-term prospective points, and the other of the two lists associated with long-term prospective points.

2. The system of claim 1, wherein the condition information pertains to weather conditions about 1–4 hours ahead along the travel route from a closest known position of the vehicle.

3. The system of claim 1, wherein the condition information pertains to weather conditions one or more days ahead along the travel route from a closest known position of the vehicle.

4. The system of claim 1 wherein the vehicle processing system receives the alerts and provides visual indication thereof.

5. The system of claim 1, wherein the vehicle processing system receives the alerts and provides an audible indication thereof.

6. The system of claim 1, wherein the vehicle processing system receives the alerts and provides one or a combination of visual and audible indications thereof depending on whether a vehicle parking brake is engaged.

7. The system of claim 1, wherein the server includes a weather broker in communication with a weather service provider through a network.

8. The system of claim 7, wherein the network is the Internet, and the weather service provider is hosted in the World Wide Web.

9. The system of claim 1, wherein the one or more lists include severity assignments associated with each alertable condition, and wherein each alert further includes the severity assignment of the alertable condition included in the alert.

10. The system of claim 1, wherein the server includes a traffic broker in communication with a traffic service provider through a network.

11. The system of claim 10, wherein the network is the Internet, and the traffic service provider is hosted in the World Wide Web.

12. The system of claim 1, wherein the condition information pertains to traffic conditions along a portion of the travel route between a closest known position of the vehicle and a first prospective point.

13. The system of claim 12, wherein the first prospective point is about 15 minutes ahead along the travel route from the closest known position of the vehicle.

14. A server for providing alerts to a remote processing systems onboard a vehicle which is adapted to travel along a predetermined travel route, the server comprising:

a vehicle location monitoring system for providing vehicle location information;

a condition information broker adapted to communicate with a service provider and acquire therefrom condition information along one or more prospective points along the travel route, the prospective points being based on a closest known position of the vehicle as indicated by the vehicle location information;

an alert generator for generating one or more alerts based on the condition information acquired from the service provider; and a communication manager for establishing a communication link with the remote processing system through which the one or more alerts are sent, wherein the one or more alerts include at least one alertable condition selected from one or more lists of alertable conditions, and wherein one of the two lists is associated with short-term prospective points, and the other of the two lists is associated with long-term prospective points.

15. The server of claim 14, wherein the service provider is a weather service provider, and the condition information pertains to weather conditions about one or more days ahead along the travel route from the closest known position of the vehicle.

16. The server of claim 14, wherein the service provider is a weather service provider, and the condition information pertains to weather conditions about 1–4 hours ahead along the travel route from the closest known position of the vehicle.

17. The server of claim 14, wherein the one or more lists include severity assignments associated with each alertable condition, and wherein each alert further includes the severity assignment of the alertable condition included in the alert.

18. The system of claim 14, wherein the service provider is a traffic service provider, and the condition information pertains to traffic conditions along a portion of the travel route between the closet known position of the vehicle and a first prospective point.

19. The system of claim 18, wherein the first prospective point is about 15 minutes ahead along the travel route from the closest known position of the vehicle.

20. The server of claim 14, wherein the condition information broker is adapted to communicate with the service provider through a network selected from one or more of the Internet, a LAN, or a WAN.

21. A method for communicating passive alerts from a server to a vehicle having a vehicle processing system and traveling along a predetermined travel route, the method comprising:

determining a closest known position of the vehicle;

acquiring condition information relating to one or more prospective points along the travel route;

generating one or more alerts based on the acquired condition information;

transmitting the one or more alerts wirelessly to the vehicle processing system; and selecting at least one alertable condition from one or more lists of alertable conditions and including the selected alertable condition in the alert, the alertable condition being selected from one of two different lists of alertable conditions, one of the two lists being associated with short-term prospective points.

22. The method of claim 21, wherein the condition information pertains to weather conditions.

23. The method of claim 21, wherein the condition information pertains to weather conditions about 1–4hours ahead along the travel route from the closest known position of the vehicle.

24. The method of claim 21, wherein the condition information pertains to weather conditions one or more days ahead along the travel route from a closest known position of the vehicle.

25. The method of claim 21, further including providing a visual indication of the alerts in the vehicle.

26. The method of claim 21, further including providing an audible indication of the alerts in the vehicle.

27. The method of claim 21, further comprising providing, in the vehicle, one or a combination of visual and audible indications of the alerts, depending on whether a vehicle parking brake is engaged.

28. The method of claim 21, wherein the condition information is acquired from a weather service provider over the Internet.

29. The method of claim 21, wherein the condition information is acquired from a traffic service provider over the Internet and pertains to traffic conditions along a portion of the travel route between the closest known position of the vehicle and a first prospective point.

30. The method of claim 29, wherein the first prospective point is about . minutes ahead along the travel route from the closest known position of the vehicle.

31. The method of claim 21, wherein the one or more lists include severity assignments associated with each alertable condition, the method further comprising including the severity assignment of the alertable condition in the alert.

32. Computer-readable media containing one or more programs which execute the following procedure for communicating passive alerts from a server to a vehicle having a vehicle processing system and traveling along a predetermined travel route:

determining a closest known position of the vehicle;

acquiring condition information relating to one or more prospective points along the travel route;

generating one or more alerts based on the acquired condition information;

transmitting the one or more alerts wirelessly to the vehicle processing system; and selecting at least one alertable condition from one or more lists of alertable conditions, and including the selected alertable condition in the alert wherein the alertable condition is selected from one of two different lists of alertable conditions, one of the two lists being associated with short-term prospective points, and the other of the two lists being associated with long-term prospective points.

33. The computer-readable media of claim 32, wherein the condition information pertains to weather conditions.

34. The computer-readable media of claim 33, wherein the condition information pertains to weather conditions about 1–4 hours ahead along the travel route from the closest known position of the vehicle.

35. The computer-readable media of claim 33, wherein the condition information pertains to weather conditions one or more days ahead along the travel route from a closest known position of the vehicle.

36. The computer-readable media of claim 32, the procedure further comprising presenting a visual indication of the alerts in the vehicle.

37. The computer-readable media of claim 32, the procedure further comprising presenting an audible indication of the alerts in the vehicle.

38. The computer-readable media of claim 32, the procedure further comprising presenting, in the vehicle one or a combination of visual and audible indications of the alerts, depending on whether a vehicle parking brake is engaged.

39. The computer-readable media of claim 32, wherein the condition information is acquired from a weather service provider over the Internet.

40. The computer-readable media of claim 32, wherein the condition information is acquired from a traffic service provider over the Internet and pertains to traffic conditions along a portion of the travel route between the closest known position of the vehicle and a first prospective point.

41. The computer-readable mediate of claim 40, wherein the first prospective point is about 15 minutes ahead along the travel route from the closest known position of the vehicle.

42. The computer-readable media of claim 32, wherein the one or more lists include severity assignments associated with each alertable condition, the procedure further comprising including the severity assignment of the alertable condition in the alert.

43. A vehicle fleet management system comprising:

one or more fleet servers each managing a vehicle fleet;

a vehicle processing system disposed in each vehicle of a fleet; and an alert server receiving vehicle-specific information from the fleet servers, the alert server obtaining, for each vehicle, condition information relating to one or more prospective points along a travel route of the vehicle, generating one or more alerts specific to the vehicle based on the condition information, and transmitting the one or more alerts wirelessly to the processing system in the vehicle, wherein each alert includes at least one alertable condition selected from one or more lists of alertable conditions, and wherein the alertable condition is selected from one of two different lists of alertable conditions, wherein one of the two lists is associated with short-term prospective points, and the other of the two lists is associated with long-term prospective points.

44. The system of claim 43, wherein the condition information pertains to weather conditions.

45. The system of claim 44, wherein the condition information pertains to weather conditions about 1–4 hours ahead along the travel route from a closest known position of the vehicle.

46. The system of claim 44, wherein the condition information pertains to weather conditions one or more days ahead along the travel route from a closest known position of the vehicle.

47. The system of claim 43, wherein the server includes a weather broker in communication with a weather service provider through a network.

48. The system of claim 47, wherein the network is the Internet, and the weather service provider is hosted in the World Wide Web.

49. The system of claim 43, wherein the one or more lists include severity assignments associated with each alertable condition, and wherein each alert further includes the severity assignment of the alertable condition included in the alert.

50. The system of claim 43, wherein the server includes a traffic broker in communication with a traffic service provider through a network.

51. The system of claim 50, wherein the network is the Internet, and the traffic service provider is hosted in the World Wide Web.

52. The system of claim 43, wherein the condition information pertains to traffic conditions along a portion of the travel route between a closest known position of the vehicle and a first prospective point.

53. The system of claim 52, wherein the first prospective point is about 15 minutes ahead along the travel route from the closest known position of the vehicle.

* * * * *